US012485386B2

United States Patent
Floyd et al.

(10) Patent No.: US 12,485,386 B2
(45) Date of Patent: Dec. 2, 2025

(54) SPIRAL WOUND MULTI-EFFECT MEMBRANE DISTILLATION MODULE

(71) Applicants: SolMem LLC, Houston, TX (US); WILLIAM MARSH RICE UNIVERSITY, Houston, TX (US)

(72) Inventors: John Allen Floyd, Bellaire, TX (US); Ibrahim Abdallah, Houston, TX (US); Ze He, Houston, TX (US); Jinjian Wu, Shanghai (CN); Qilin Li, Houston, TX (US)

(73) Assignee: SolMem LLC, Houston, TX (US)

( * ) Notice: Subject to any disclaimer, the term of this patent is extended or adjusted under 35 U.S.C. 154(b) by 506 days.

(21) Appl. No.: 18/016,003

(22) PCT Filed: Jul. 15, 2021

(86) PCT No.: PCT/US2021/041860
§ 371 (c)(1),
(2) Date: Jan. 13, 2023

(87) PCT Pub. No.: WO2022/016000
PCT Pub. Date: Jan. 20, 2022

(65) Prior Publication Data
US 2023/0271139 A1    Aug. 31, 2023

Related U.S. Application Data

(60) Provisional application No. 63/052,355, filed on Jul. 15, 2020.

(51) Int. Cl.
*B01D 61/36* (2006.01)
*B01D 63/10* (2006.01)
*B01D 63/12* (2006.01)

(52) U.S. Cl.
CPC ....... *B01D 61/3641* (2022.08); *B01D 61/366* (2013.01); *B01D 63/10* (2013.01);
(Continued)

(58) Field of Classification Search
None
See application file for complete search history.

(56) References Cited

U.S. PATENT DOCUMENTS 9,694,324 B2    7/2017 Heinzl
2005/0029192 A1  2/2005 Arnold et al.
(Continued)

FOREIGN PATENT DOCUMENTS

DE    102004040950 A1    3/2006
EP       2318124 A1       5/2011
(Continued)

OTHER PUBLICATIONS

Communication pursuant to Article 94(3) EPC mailed Dec. 11, 2023, issued in corresponding European Patent Application No. 21 752 806.6 (9 pages).
(Continued)

*Primary Examiner* — Krishnan S Menon
(74) *Attorney, Agent, or Firm* — Chamberlain, Hrdlicka, White, Williams & Aughtry P.C.; Aly Z. Dossa

(57) ABSTRACT

A distillation device and method of manufacturing a distillation device is disclosed. The distillation device includes at least one spiral wound membrane distillation (MD) unit. The spiral wound MD unit includes a perforated center tube concentric to a cylindrical housing and a plurality of effects spirally wound around the center tube. Each of the effects include a vapor permeable membrane, a feed spacer disposed on the vapor permeable membrane, a permeate spacer, and a heat exchange film. The permeate spacer is disposed between the vapor permeable membrane and the heat
(Continued)

exchange film. Distillation of a feed fluid by the plurality of effects deposits a condensate fluid into the center tube.

20 Claims, 11 Drawing Sheets

(52) U.S. Cl.
CPC ...... *B01D 63/12* (2013.01); *B01D 2311/1031* (2022.08); *B01D 2313/10* (2013.01); *B01D 2313/221* (2022.08); *B01D 2313/246* (2013.01); *B01D 2319/022* (2013.01)

(56) References Cited

U.S. PATENT DOCUMENTS

| | | |
|---|---|---|
| 2006/0131235 A1 | 6/2006 | Offeman et al. |
| 2013/0319923 A1 | 12/2013 | Heinzl |
| 2017/0014773 A1 | 1/2017 | Swaminathan et al. |

FOREIGN PATENT DOCUMENTS

| | | |
|---|---|---|
| JP | 2020512930 A | 4/2020 |
| WO | 2010011138 A1 | 1/2010 |
| WO | 2014164244 A1 | 10/2014 |
| WO | 2014164255 A1 | 10/2014 |
| WO | 2016041292 A1 | 3/2016 |
| WO | 2017008006 A1 | 1/2017 |
| WO | 2017015140 A1 | 1/2017 |
| WO | 2019233610 A1 | 12/2019 |
| WO | 2020021303 A1 | 1/2020 |

OTHER PUBLICATIONS

International Search Report and Written Opinion of the International Searching Authority mailed Oct. 28, 2021, issued in corresponding PCT Application No. PCT/US2021/041860 (17 pages).

K. Zhao et al., "Experimental study of the memsys vacuum-multi-effect-membrane-distillation (V-MEMD) module", Desalination 323 (Year: 2013) pp. 150-160 (11 pages).

Said Ibrahim A. et al., "Low-Cost Desalination for Seawater and Hypersaline Brine Using Nanophotonics Enhanced Solar Energy Membrane Distillation" Environ. Sci.: Water Res. Technol. Jun. 17, 2020, pp. 2180-2196, vol. 6, No. 8 (18 pages).

SPIRAL WOUND MULTI-EFFECT MEMBRANE DISTILLATION MODULE

CROSS REFERENCE TO RELATED APPLICATIONS

This application priority to International Application No. PCT/US2021/041860, filed Jul. 15, 2021, which claims the priority and benefit from U.S. Provisional Application No. 63/052,355 for SPIRAL WOUND MULTI-EFFECT MEMBRANE DISTILLATION MODULE, filed Jul. 15, 2020, which are incorporated herein by reference for all purposes.

GOVERNMENT INTEREST

This invention was made with government support under Grant No. EEC 1449500, awarded by the National Science Foundation (NSF) from the Nanoscale Science and Engineering Initiative of the NSF under NSF. The United States government has certain rights in the invention.

BACKGROUND

Existing multi-effect membrane distillation (MD) technologies may require highly complex membrane module configurations that may include separate membrane and heat exchange surfaces; structural supports; separate feed and/or permeate inlets; and fluid transfer conduits to transfer feed. Further, complex paths of both feed and permeate (both vapor and condensate) flows may lead to large head loss due to friction, and therefore, may require higher pumping energies.

SUMMARY

In one aspect, embodiments disclosed herein relate to a distillation device that includes a cylindrical housing, and one or a plurality of spiral wound membrane distillation (MD) units connected in series. The or each spiral wound MD unit includes a perforated center tube, concentric to the cylindrical housing, a vapor permeable membrane, a feed spacer disposed on the vapor permeable membrane, a permeate spacer, and a heat exchange film, spirally wound around the center tube. The permeate spacer is disposed between the vapor permeable membrane and the heat exchange film. Each spiral loop forms an effect, and the units consists of a plurality of effects. Distillation of a feed fluid by the plurality of effects deposits a condensate fluid into the center tube. The distillation device may include two flow distribution devices disposed on each end of the one or plurality of spiral wound MD units. The distillation device also includes a first cap on one end of the cylindrical housing that includes a feed water inlet, and a second cap on the other end of the cylindrical housing that includes a clean water outlet attached to the center tube and a brine outlet.

In another aspect, embodiments disclosed herein relate to a method of manufacturing a distillation device that includes sealing a rectangular vapor permeable membrane to a rectangular heat exchange film on three edges and disposing a permeate spacer between the vapor permeable membrane and the heat exchange film. The method also includes disposing a feed spacer on the vapor permeable membrane film. The unsealed edge is attached to a perforated center tube where the permeate spacer coincides with the perforations of the center tube. The center tube is rotated to form a spiral wound membrane distillation (MD) unit.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
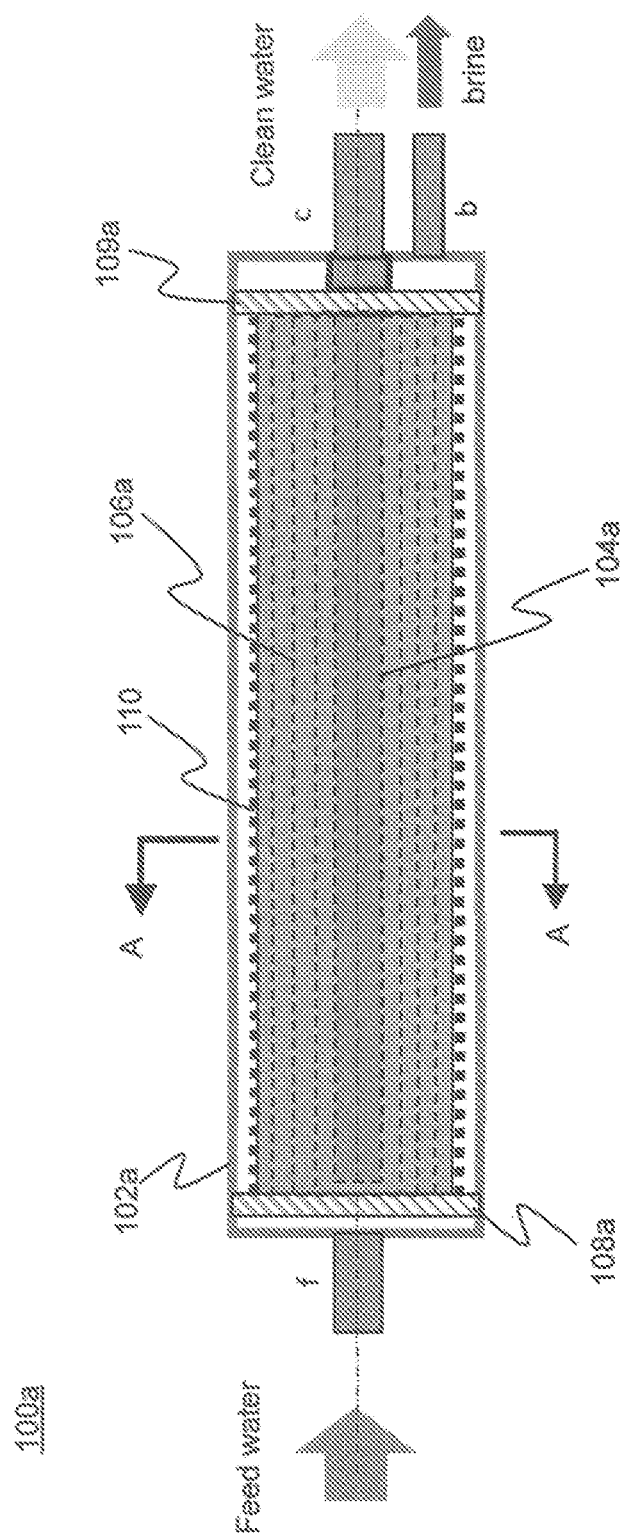
FIGS. 1A and 1B show single unit devices in accordance with one or more embodiments disclosed herein.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference, and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the invention relate to a module and method of manufacturing a module for membrane distillation. More specifically, embodiments describe a novel membrane reactor design that enables multi-effect membrane distillation in a simple, compact, cross-current spiral wound module.

Embodiments of a module and method of manufacturing a module disclosed herein may include a novel spiral-wound configuration of a layered structure with layers that include a feed spacer, vapor permeable membrane, heat exchange film, and permeate spacer. Embodiments may provide fluid transfer conduit, or separate inlets and outlets for each effect without additional physical structures, as each spiral in the spiral wound membrane unit forms as an effect.

In one or more embodiments, heat input from a first effect or recovered from vapor condensation in a previous effect evaporates feed water in each effect, and serves as the coolant to condense the vapor generated in the previous effect. Efficient heat recovery in consecutive effects results in a gain-output-ratio (GOR) many times greater than that of a single-effect MD and may provide a higher thermal efficiency and water production rate.

Embodiments disclosed herein may utilize different heat sources. For example, embodiments may include a membrane surface for photothermal heating upon light irradiation. Embodiments may also include a membrane surface for an electrothermal coating that generates heat through the application of electricity. In some embodiments, heat may be provided by heating some or all of the feed water using a heater. Other embodiments may include combinations of the heating elements described herein.

FIG. 1A demonstrates a single unit device in accordance with one or more embodiments disclosed herein. The single unit device (100a) includes a cylindrical module housing (102a) with a feed water inlet (f) for receiving the feed water, a clean water outlet (c) and a brine outlet (b). The clean water outlet (c) is aligned with, and attached to, a center tube for permeate collection (104a). The center tube for permeate collection is a perforated tube that may be positioned on a central axis of the module housing (102a). As will be explained in more detail below, a spiral wound MD unit (106a) is disposed around the center tube for permeate collection (104a), and between the flow distribution and anti-telescoping components (108a and 109a). In the embodiments described by FIG. 1A, a thermal coating (110) is disposed around the spiral wound MD unit (106a). The thermal coating (110) is used to apply heat to the device (100a), and the thermal coating (110) may be photothermal or electrothermal.

For photothermal embodiments, portions of the module housing (102a) may be transparent to allow light irradiation. For example, a transparent housing made of materials such as quartz, borosilicate glass, and/or poly(methyl methacrylates), such as plexiglass, may be used in accordance with embodiments disclosed herein. Photothermal embodiments that utilize solar radiation may also include additional collectors/concentrators to facilitate the heating. For example, a parabolic trough, linear Fresnel reflectors, and solar power tower collectors may be used to focus the solar radiation. One of ordinary skill in the art will appreciate that other configurations may be used to facilitate the collection and focusing of radiation in the photothermal embodiments.

For electrothermal embodiments, the thermal coating (110) may be heated using an applied voltage. In such embodiments, the thermal coating element of the membrane would be connected with a power supply via thermal-carrier electrical wires (not shown). When a certain electric voltage is applied, the thermal heating element would generate Joule heat, which is conducted to the adjacent feed water. The heated feed water evaporates at the interface, and the vapor transfers to the permeate side.

In accordance with one or more embodiments disclosed herein, feed water is supplied through the feed water inlet (f) while the thermal coating (110) supplies heat such that the spiral wound MD unit (106a) distills the feed water resulting in the deposition of clean water in the center tube for permeate collection (104a) which is released through the clean water outlet (c). The resultant brine is released through the brine outlet (b).

Figure 1B:
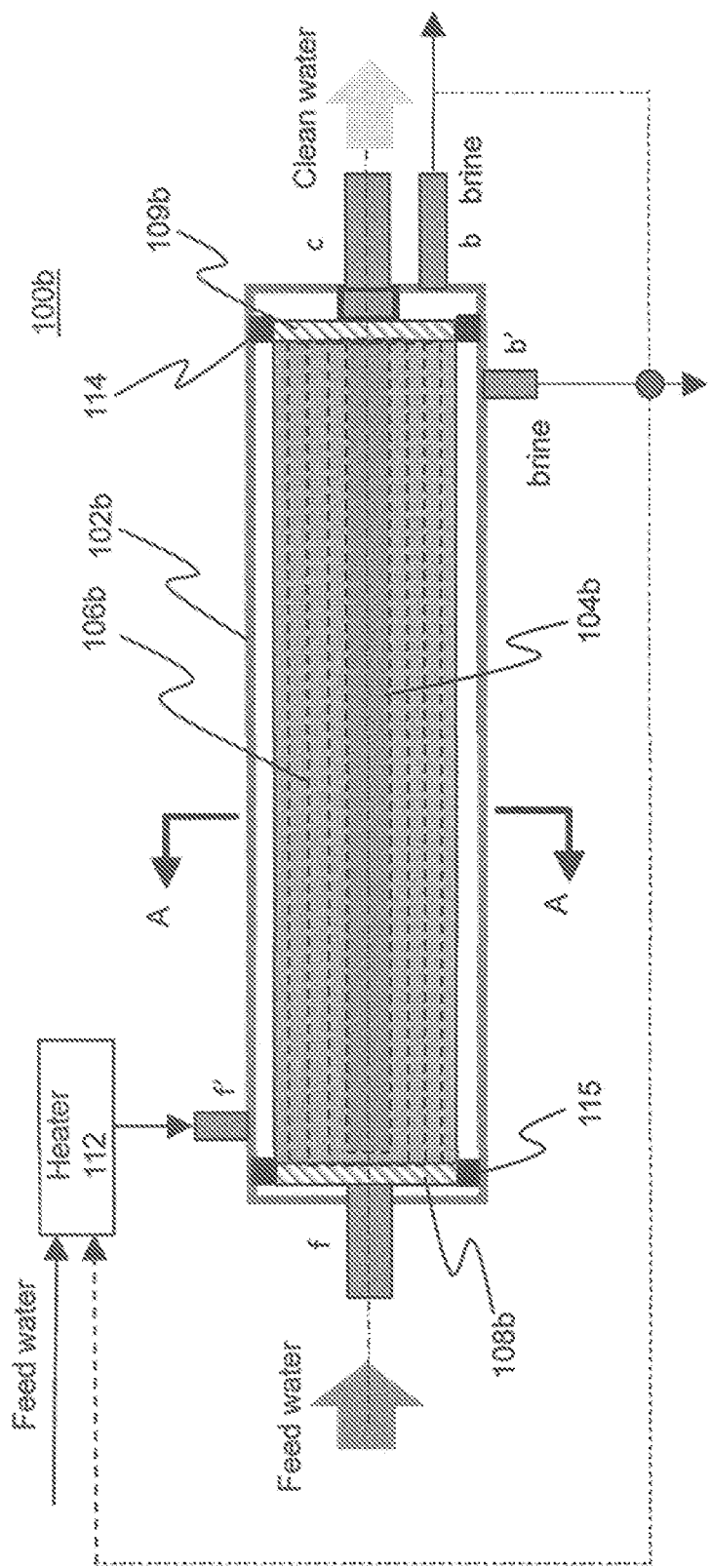

FIG. 1B shows another single unit device in accordance with one or more embodiments disclosed herein. The single unit device (100b) includes a module housing (102b), flow distribution and anti-telescoping components (108b and 109b), a feed water inlet (f), a clean water outlet (c), a brine outlet (b), a center tube for permeate collection (104b), and a spiral wound MD unit (106b) similar to FIG. 1A. In the embodiments described by FIG. 1B, rather than a thermal coating, feed water, or a portion of the feed water, is supplied to the single unit device (100b) via a heater (112). The heater (112) heats the feed water and flows into the module housing (102b), using an additional inlet (f'), positioned in a radial direction of the housing (102b). The additional inlet (f') may be positioned on the housing (102b) between the flow distribution and anti-telescoping components (108b and 109b) near the feed water inlet (f). Embodiments may also include an additional brine outlet (b') positioned in a radial direction of the housing (102b), between the flow distribution and anti-telescoping components (108b and 109b) near the clean water (c) and brine (b) outlets.

In one or more embodiments described by FIG. 1B, sealing gaskets (114, 115) may be disposed around the flow distribution and anti-telescoping components (108b and 109b) such that the flow distribution and anti-telescoping components (108b and 109b) substantially cover the ends of the spiral wound MD unit (106b). The sealing gaskets (114, 115) help to keep the heated feed water from the additional inlet (f') contained predominantly near the surface of the spiral wound MD unit (106b).

In one or more embodiments, there may exist two separate flow channels for the feed water. A first channel internal to the spiral wound unit (106b) via the inlet (f), and a second channel in the space between the spiral wound unit (106b) and the module housing (102b) via the inlet (f'). Different flow rates between the channels in combination with the different temperatures of the feed water in the channels contribute to the performance of the device in accordance with one or more embodiments disclosed herein. For example, the lower temperature of the feed water in the channels internal to the spiral wound unit (106b) may act as a coolant and, thus, contribute to the permeate condensation.

In accordance with one or more embodiments disclosed herein, feed water is supplied through the feed water inlet (f) and additional feed water is heated by the heater (112) and supplied through the inlet (f'). The heated feed water supplies the necessary heat such that the spiral wound MD unit (106b) distills the feed water resulting in the deposition of clean water in the center tube (104b) which is released through the clean water outlet (c). The resultant brine may be released through the brine outlet (b) and/or the additional brine outlet (b').

In accordance with one or more embodiments disclosed herein, the brine from the brine outlet (b), and/or the brine outlet (b'), may be fed back into the heater (112). Such brine may still contain heat that may be used for further distillation and/or additional clean water may be distilled. In addition, by feeding back the previously heated brine output, the strain on the heater (112) may be reduced.

Figure 2:
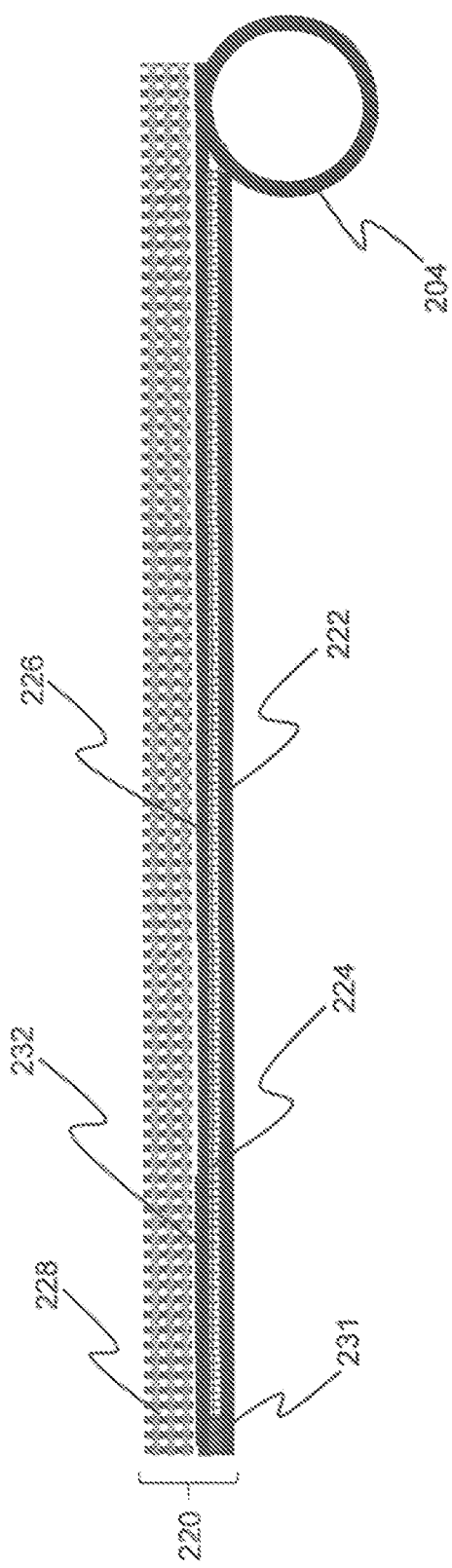
FIG. 2 shows a schematic of a membrane leaf prior to rolling in accordance with one or more embodiments disclosed herein.
Figure 3:
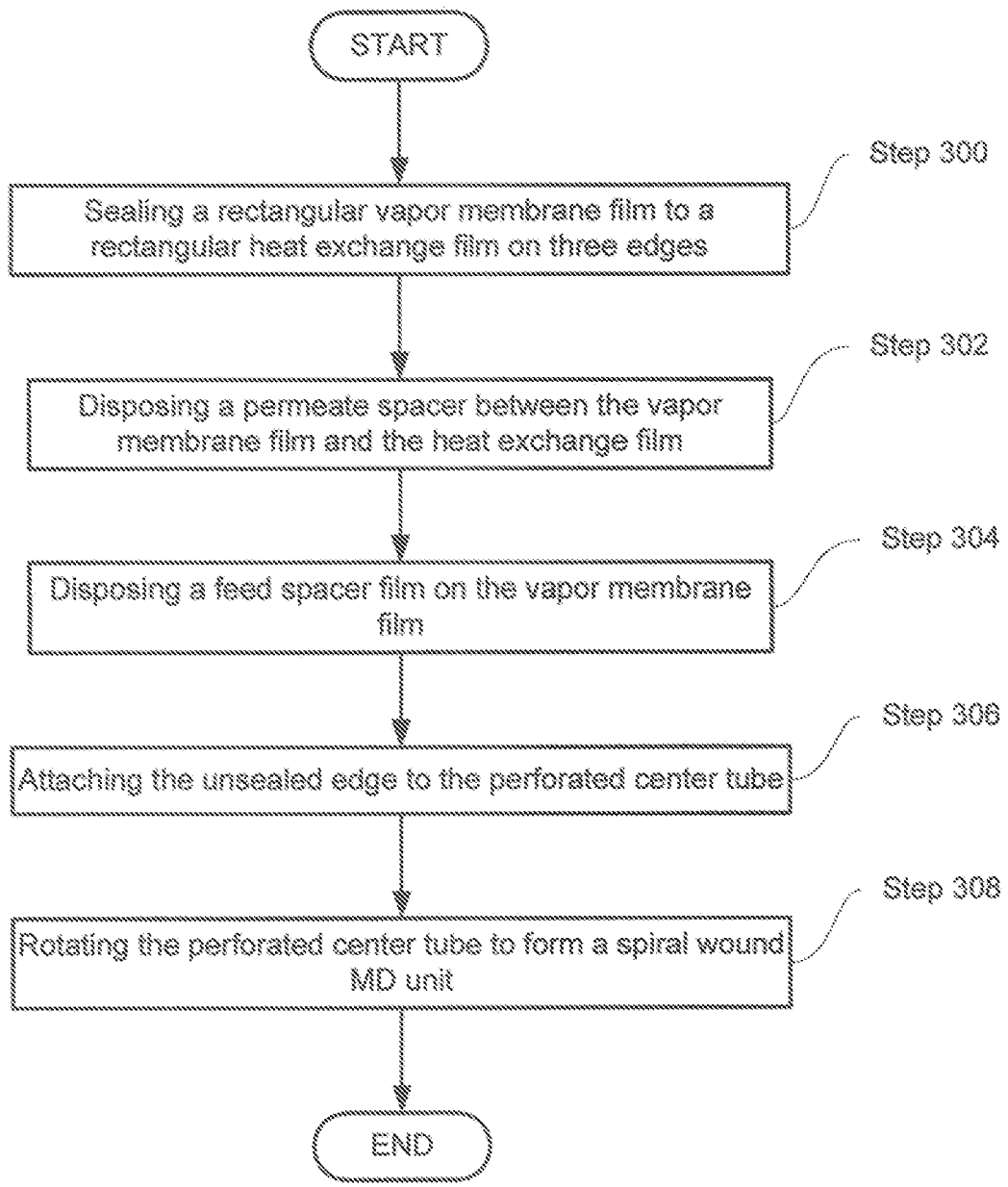
FIG. 3 shows a flowchart of a method of manufacturing a spiral wound MD unit in accordance with one or more embodiments disclosed herein.

FIGS. 2 and 3 describe manufacturing of the embodiments disclosed herein. FIG. 2 describes the multiple layers that make up the spiral wound units shown prior to spiraling the collection of multiple layers; and FIG. 3 describes a flow chart outlining the steps of manufacturing a spiral wound MD unit in accordance with embodiments disclosed herein.

Referring to FIG. 2, the collection of multiple layers (220) is rectangular in shape and includes a heat exchange film (222), a permeate spacer (224), a vapor permeable membrane (226), and a feed spacer layer (228). The collection of multiple layers (220) includes a seal (231) that seals three of the edges of the rectangular collection of multiple layers (220). In some embodiments, the collection of multiple layers (220) may also include a thermal element (232).

Embodiments of the heat exchange film (222) may include any thermally conducting thin film. Examples of the materials of the heat exchange file include, but are not limited to, aluminum foil, polymer reinforced aluminum foil, polymer coated Cu films, and/or thermally conducting polymer films. Embodiments of the heat exchange film (222) may be corrosion resistant on at least on one side. For example, the side of the heat exchange film (222) that may be in contact with the feed solution may be designed to be corrosion resistant. Embodiments of the heat exchange film (222) may also be designed such that a side of the heat exchange film (222) in contact with a permeate solution has rough features, and/or a superhydrophobic coating to facilitate condensation.

Embodiments of the permeate spacer (224) may be any porous, thermally conducting material. Examples of the materials of the permeate spacer include, but are not limited to, aluminum and other metal mesh, metal wool, and/or thermally conductive polymer meshes.

Embodiments of the vapor permeable membrane (226) include any membrane that is non-permeable to liquid water, but permeable to vapor. Example materials of the vapor permeable membrane include, but are not limited to polypropylene, PTFE, PVDF, polyethylene, and inorganic membranes, such as carbon membranes.

Embodiments of the feed spacer (228) include any mesh spacer made of a corrosion resistant material. Example materials of the feed spacer include, but are not limited to, different types of polymers, such as polypropylene, and/or nylon.

As previously noted, embodiments may also include a thermal element (232). The size and position of the thermal element (232) is selected such that the thermal element (232) is on an outmost radius of the spiral wound unit (106), at the conclusion of manufacturing in accordance with one or more embodiments disclosed herein.

As previously noted, the thermal element (232) may be a photothermal or electrothermal material. In some photothermal embodiments, a black, porous fine polymer mesh, or a porous polymer film coated with carbon nanomaterials (e.g., carbon black nanoparticles) may be used. In other photothermal embodiments, a porous polypropylene film coated with carbon black nanoparticles or a porous polypropylene film coated with a polydopamine coating may be used. The thermal element (232) of the photothermal embodiments may be made from any material known to absorb radiation and generate heat that will not degrade in a feed water.

In electrothermal embodiments, any material that may be heated using an applied voltage and does not degrade in feed water may be used in accordance with embodiments herein. For example, a stainless steel mesh with an anti-corrosion, insulating nanocoating, or a carbon nanotube based film, may be used in accordance with embodiments disclosed herein.

Referring to FIG. 3, in Step 300, a rectangular vapor permeable membrane is sealed on three edges to a heat exchange film. In some embodiments, the films may be sealed using an adhesive. In some embodiments, the films may be thermally sealed. In such embodiments, a hot metal bar may be used to thermally seal the rectangular vapor membrane to the heat exchange film by melting the layers together. One of ordinary skill in the art will appreciate that other methods of sealing the layers may be used.

In Step 302, a permeate spacer is disposed in the pocket formed between the rectangular vapor permeable membrane and the heat exchange film. In Step 304, a feed spacer film is deposited on the vapor permeable membrane.

In Step 306, the unsealed edge of the collection of layers from the previous steps is attached to the perforated center tube. The layers may be attached to the center tube using an adhesive such that the permeate spacer layer coincides with the perforations in the center tube.

In Step 308, the perforated center tube is rotated to wrap the collection of layers around the center tube. In this disclosure, each complete wrapping of the collection of layers around the center tube is referred to as an effect. That is, an effect refers to a layer in the radial direction of the center tube that includes the collection of multiple layers (220).

As previously noted, embodiments of the spiral wound MD unit (106a) may include a thermal element (232). In such embodiments, the thermal element (232) may be disposed on the vapor permeable membrane (226) prior to rolling the center tube (204). In some embodiments, the thermal elements (232) may be disposed on the vapor permeable membrane (226) prior to depositing the feed spacer film (228).

In accordance with embodiments disclosed herein, one or more spiral wound MD units may be disposed in a housing and affixed to caps that include the inlets/outlets, flow distribution anti-telescoping devices, seals, etc. One of ordinary skill in the art will appreciate that such assembly may be conducted in accordance with known techniques.

Figure 4A:
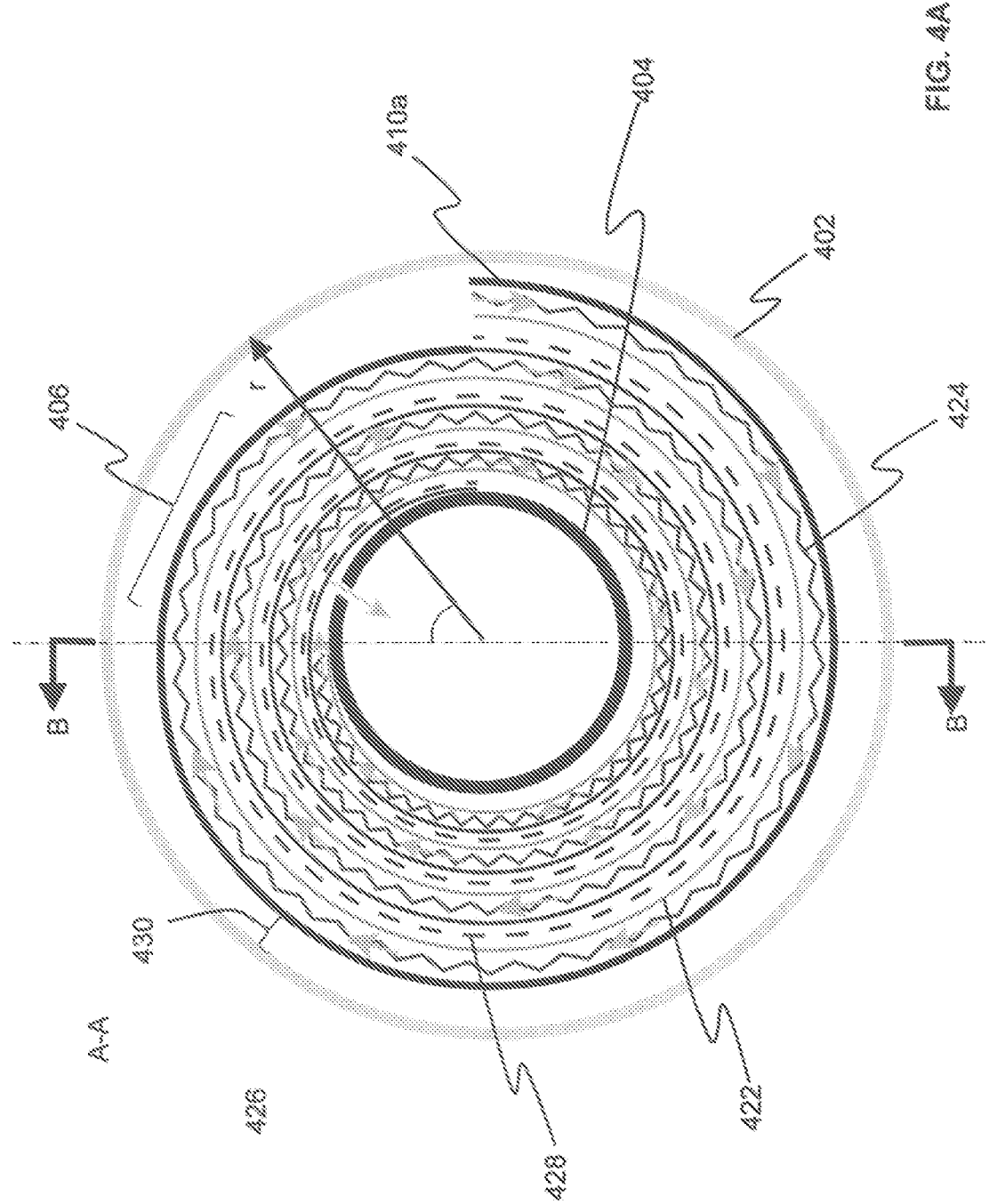
FIG. 4A shows a first cross section of a spiral wound distillation unit in accordance with one or more embodiments disclosed herein.

FIG. 4 shows cross sections of a device in accordance with embodiments disclosed herein. FIG. 4A shows a first cross section that corresponds to the A-A plane of the device of FIG. 1A in accordance with one or more embodiments disclosed herein. FIG. 4A includes the module housing (402), center tube for permeate collection (404), and four effects. Each effect includes the heat exchange film (422), a permeate spacer (424), a vapor permeable membrane (426), and a feed spacer layer (428) in accordance with embodiments disclosed herein.

The water gap (430) is the space between the module housing (402) and the spiral wound MD unit (406). The size of the water gap strongly influences the volume of the feed water device. A larger water gap may increase the maximum feed water residence time because the feed water channel volume of the device would increase. Further, a larger gap may also require an increase in a feed water flow rate in order to avoid boiling in the device, which may result in pressurizing the device. A larger water gap may also lead to a lower membrane surface temperature because the energy in the device may be more distributed. However, the water gap must be large enough to avoid fouling the feed chamber.

In the example of FIG. 4A, a thermal element (410a) is shown. As explained with reference to FIG. 2, the thermal element (410a) is designed to cover the outer surface of the spiral wound MD unit (406).

Figure 4B:
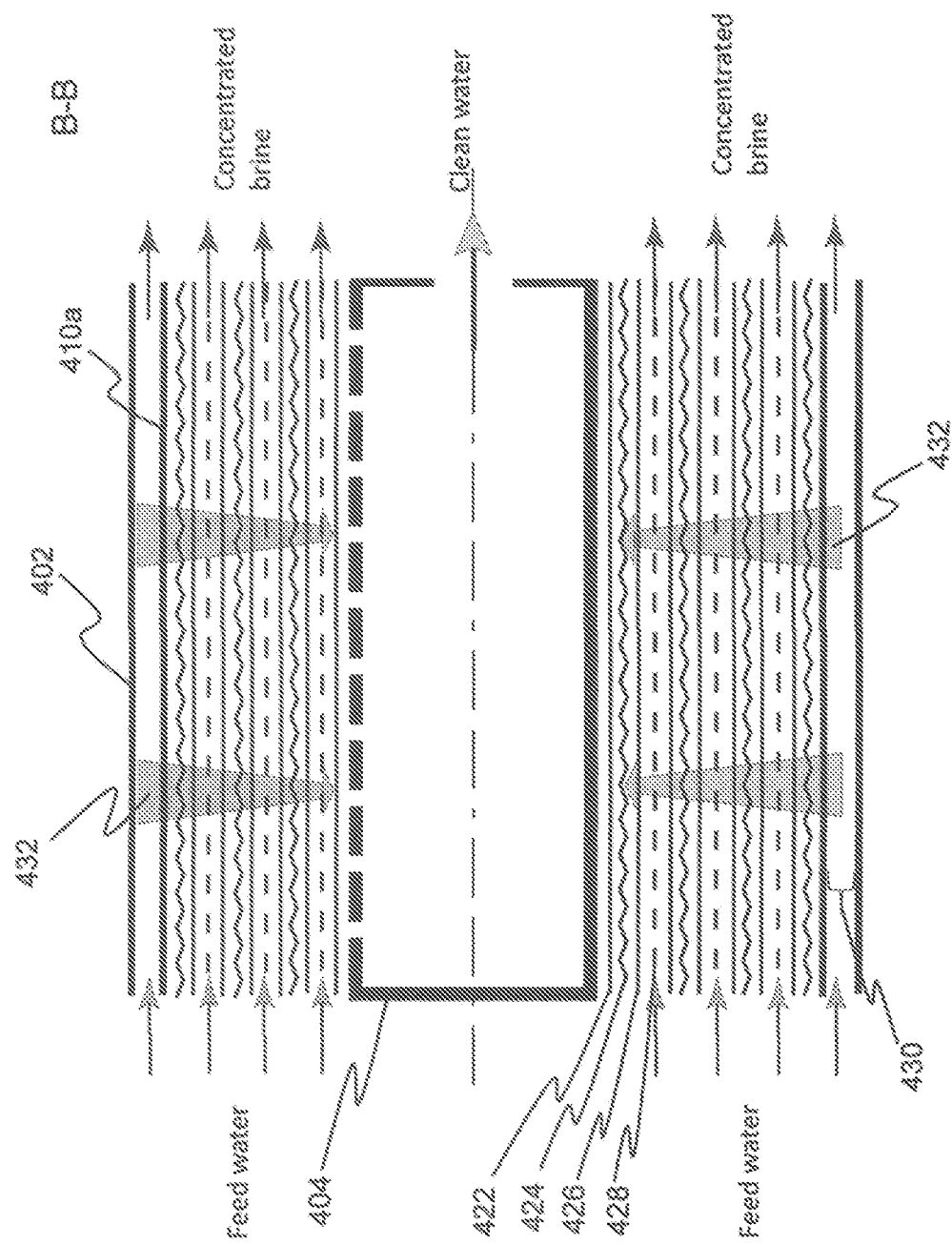
FIG. 4B shows a second cross section of a spiral wound distillation unit in accordance with one or more embodiments disclosed herein

FIG. 4B shows a second cross section that corresponds to the B-B plane of FIG. 4A in accordance with one or more embodiments disclosed herein. FIG. 4B includes the module housing (402), center tube for permeate collection (404), and the four effects. Each effect includes the heat exchange film (422), a permeate spacer (424), a vapor permeable membrane (426), and a feed spacer layer (428) in accordance with embodiments disclosed herein. The example of FIG. 4B also includes the thermal element (410a) and illustrates the water gap (430). The arrows (432) of FIG. 4B illustrate the direction of the heat flux (and vapor flow) during operation of the device in accordance with embodiments disclosed herein.

In accordance with embodiments disclosed herein, the membrane surface is heated either via the heated feed water, a photothermal element, or electrothermal element. The heat results in the evaporation of the feed water in a first effect. The vapor transports through the membrane, and exchanges heat with the colder feed water in a second effect through the heat-conducting film. As a result, the vapor gets condensed to form clean water. The heat taken up by the feed water in the second effect drives the evaporation in the second effect. The process continues to propagated heat all the way to the last effect closest to the center tube in accordance with embodiments disclosed herein.

In accordance with embodiments disclosed herein, referring to FIG. 4A, the radius of the housing (r) controls the size of the module. A larger housing may increase the number of evaporator effects that can fit into the housing, but a larger housing would also increase the feed water residence time. More effects may result in a higher gained output ratio (GOR). The GOR is a ratio of the amount of energy used for evaporation over the amount of energy input to the system. Although the GOR increases with the number of effects, there is a point where additional effects do not significantly contribute to the GOR. Accordingly, the number of effects may be balanced with a desired GOR and the cost of the materials due, in part, to the amount of membrane needed to construct the effects.

For example, for solar-photothermal embodiments, a larger housing may result in a smaller solar concentration ratio, which may lead to a lower membrane surface temperature and, therefore, a lower vapor pressure gradient and lower average flux. The vapor pressure gradient across the effects may be the main distillation driving force. In this context, the solar concentration ratio is a representation of the solar radiation which may be concentrated onto the device. For example, for embodiments that utilize a parabolic trough, the solar concentration ratio is a ratio between parabolic trough area exposed to solar radiation, and the area of the device (i.e., the module housing). The average flux refers to the amount of water (typically in kilograms) that passes from the feed chamber to the center tube in accordance with embodiments disclosed herein.

Other factors that may contribute to the performance of embodiments disclosed herein include, but are not limited to, the thickness and length of the housing, the thickness of the various layers in each effect, the radius of the center tube, the flow rates of the fluids involved, and the residence time of the feed water in the water gap.

For example, the thickness of the module housing may determine the mechanical stability of the device. For example, in solar-photothermal embodiments where the housing is glass, a thicker glass may be mechanically stable, but would transmit less light, leading to a lower efficiency of sunlight to membrane surface heat. The housing thickness may also impact the volume of the gap and, thus, the feed chamber residence time and feed flow rate.

Similarly, the length of the housing also affects the volume of the feed chamber and, thus, the feed chamber residence time and feed flow rate. A longer housing may increase the feed chamber residence time, but may require an increased feed flow rate in order to avoid boiling the feed water and pressurizing the feed chamber.

In accordance with embodiments disclosed herein, the thickness of the various layers in each effect contribute to the mechanical stability of embodiments, and the number of effects that may be used in a given housing. The thickness of the various layers may also affect the GOR, or performance, of an embodiment. For example, a thicker vapor permeable membrane may increase the distance vapor must travel in the membrane pores, which may reduce the efficiency. A thicker heat exchange film may have a higher thermal resistance and, thus, provide less condensation.

In accordance with embodiments disclosed herein, the thickness of the feed spacer layer determines the volume of the inner feed, or coolant channel. A thicker feed spacer may result in less hydraulic resistance in the inner feed channels. Similarly, the thickness of the permeate spacer controls the volume of the permeate channel in accordance with embodiments disclosed herein. A thicker permeate spacer may also result in less hydraulic resistance in the permeate channel.

In accordance with embodiments disclosed herein, the radius of the center tube is large enough to provide a sufficient surface area for binding the effects, and to transport the permeate water without significant head loss.

One of ordinary skill in the art will appreciate that the flow rates of the fluids involved will contribute to the performance of embodiments disclosed herein. For example, a lower flow rate in the gap may lead to higher clean water production because the heat is delivered directly to the membrane surface (where the evaporation occurs). Conversely, a higher flow rate in the gap may convect the heat away from the membrane surface. The flow rate in the gap is engineered to ensure that the heat remains on the surface of the membrane, without boiling the feed water and pressurizing the feed chamber.

As described in reference to FIG. 1B, one or more embodiments disclosed herein may include two separate flow channels for the feed water. In such embodiments, the flow rate of the feed water channels internal to the spiral wound unit is engineered to provide the sufficient heat capacity for permeate condensation. However, the overall efficiency of the device may be diminished by increasing this flow rate when considering the energy necessary to pump the fluid. In accordance with embodiments disclosed herein, the flow rate of the feed water channel internal to the spiral wound may be strongly influenced by the energy input, or in photothermal embodiments, the average solar radiation.

The following example and values presented are not intended to limit the invention in any way. These specific values presented herein are intended to help illustrate the relationships between the different variables in accordance with the above. For example, the housing may have a radius of ~40 mm, a length of ~1 m, and a thickness of ~4 mm. The center tube may have a radius of ~8.55 mm. The feed spacer layer, vapor permeable membrane, permeate spacer, and heat exchange film may have thicknesses of ~0.6 mm, ~0.2032 mm, ~0.6 mm, and ~0.1 mm, respectively. The dimensions presented in this example provide for 12 effects and a GOR of 4. This may provide for an average flux of 9.88 kg/m2-hr with a feed water flow rate of 5.25 L/hr (in the gap) and a feed water residence time of ~210 min.

Figure 5:
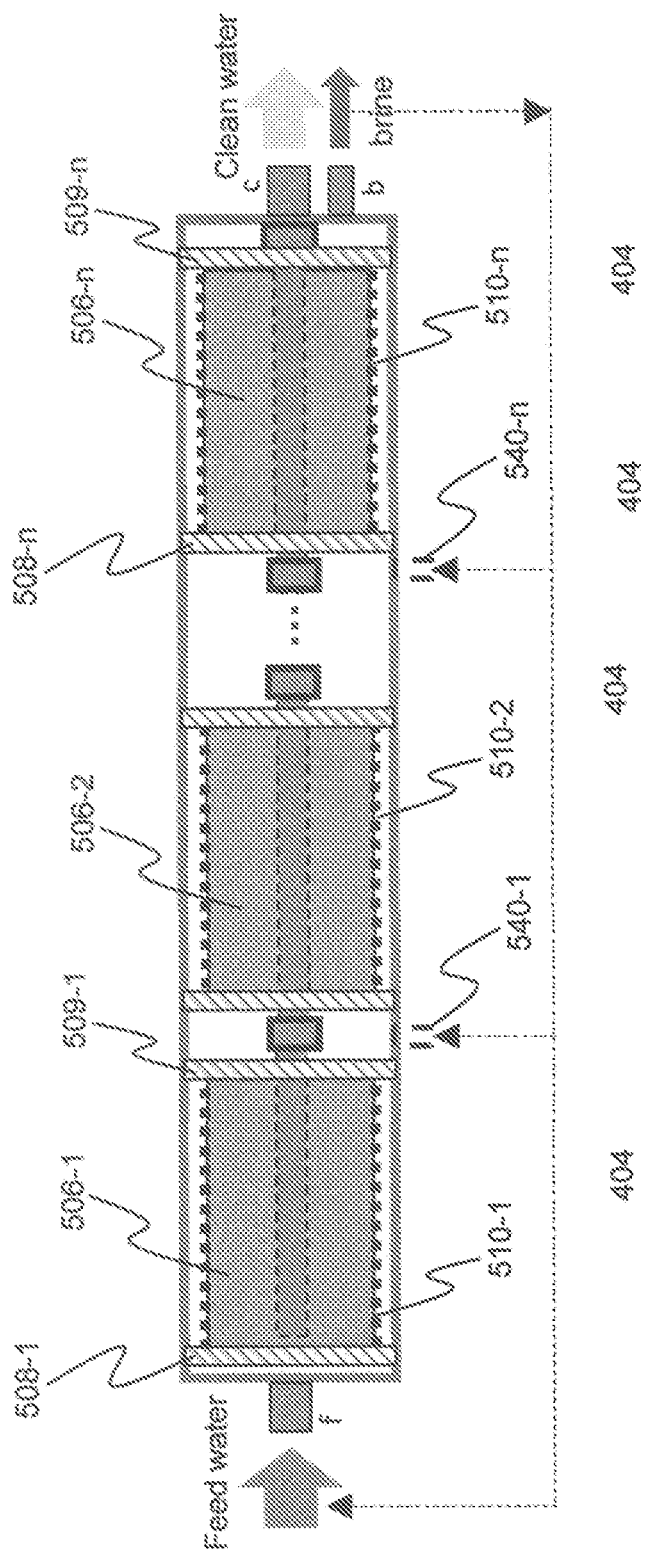
FIG. 5 shows a schematic example of a multiple unit device in accordance with one or more embodiments disclosed herein.

FIGS. 5-7 provide examples of devices with multiple spiral wound MD units in a single housing in accordance with embodiments disclosed herein.

In embodiments described by FIG. 5, multiple spiral wound MD units (506-1, 506-2 . . . 506-n) may be connected in series in a single housing (502). In FIG. 5, the flow distribution devices (508-1 . . . 508-n and 509-1 . . . 509-n) are similar to the flow distribution devices presented in FIG. 1A. The multiple spiral wound MD units (506-1, 506-2 . . . 506-n) each include a thermal element (510-1 . . . 510-n) for supplying the necessary heat to the spiral wound MD units (506-1, 506-2 . . . 506-n). As disclosed in previous embodiments, the embodiments described by FIG. 5 may feed back the brine from the brine outlet (b) to the feed water inlet (f). The embodiments may optionally include additional brine outlets (540-1 . . . 540-n) along the body of the housing (502) that feed back the brine to feed water inlet (f). The number and position of the additional brine outlets is not particularly limited. In FIG. 5, the additional brine outlets are arranged in the spaces between the between the flow distribution devices (508-1 . . . 508-n and 509-1 . . . 509-n) of the individual spiral wound MD units (506-1, 506-2 . . . 506-n).

Figure 6A:
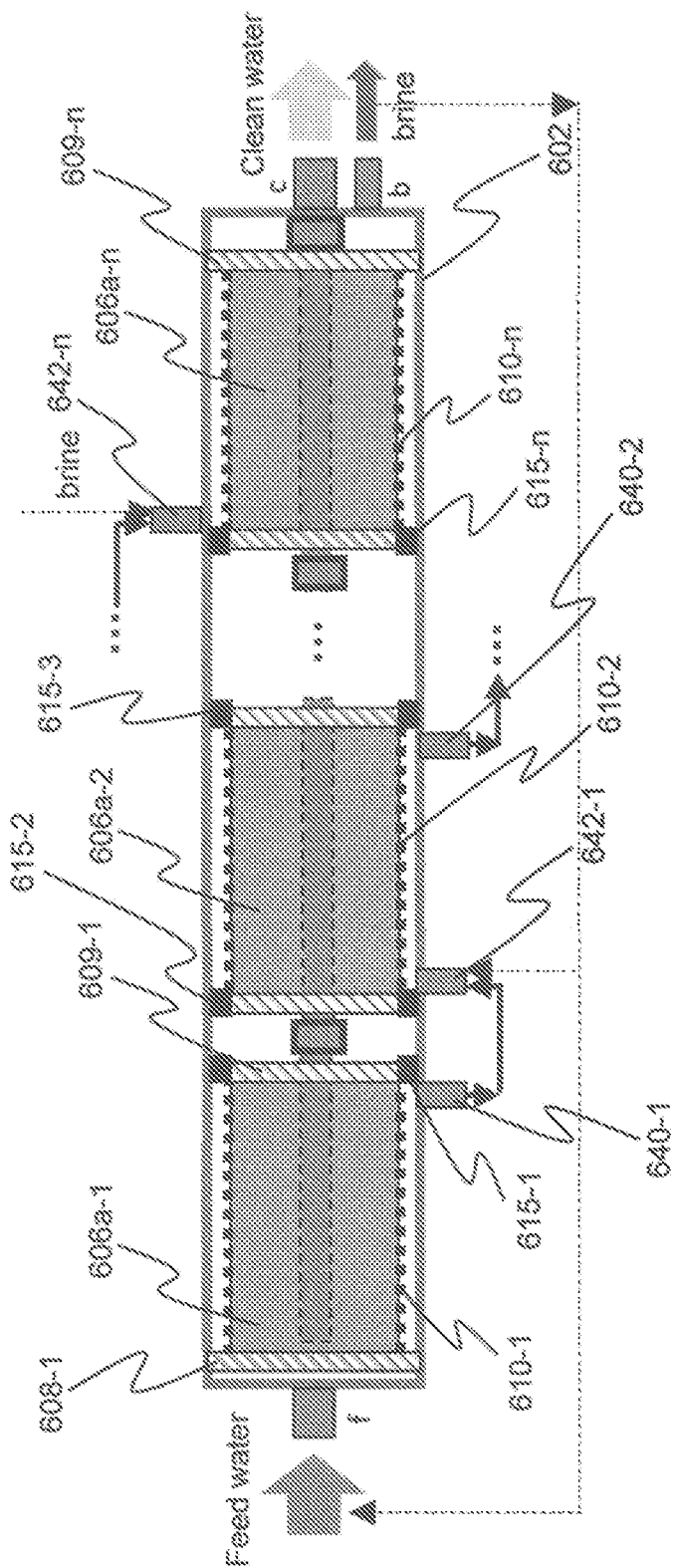
FIGS. 6A and 6B show schematics of a multiple unit device in accordance with one or more embodiments disclosed herein.
Figure 6B:
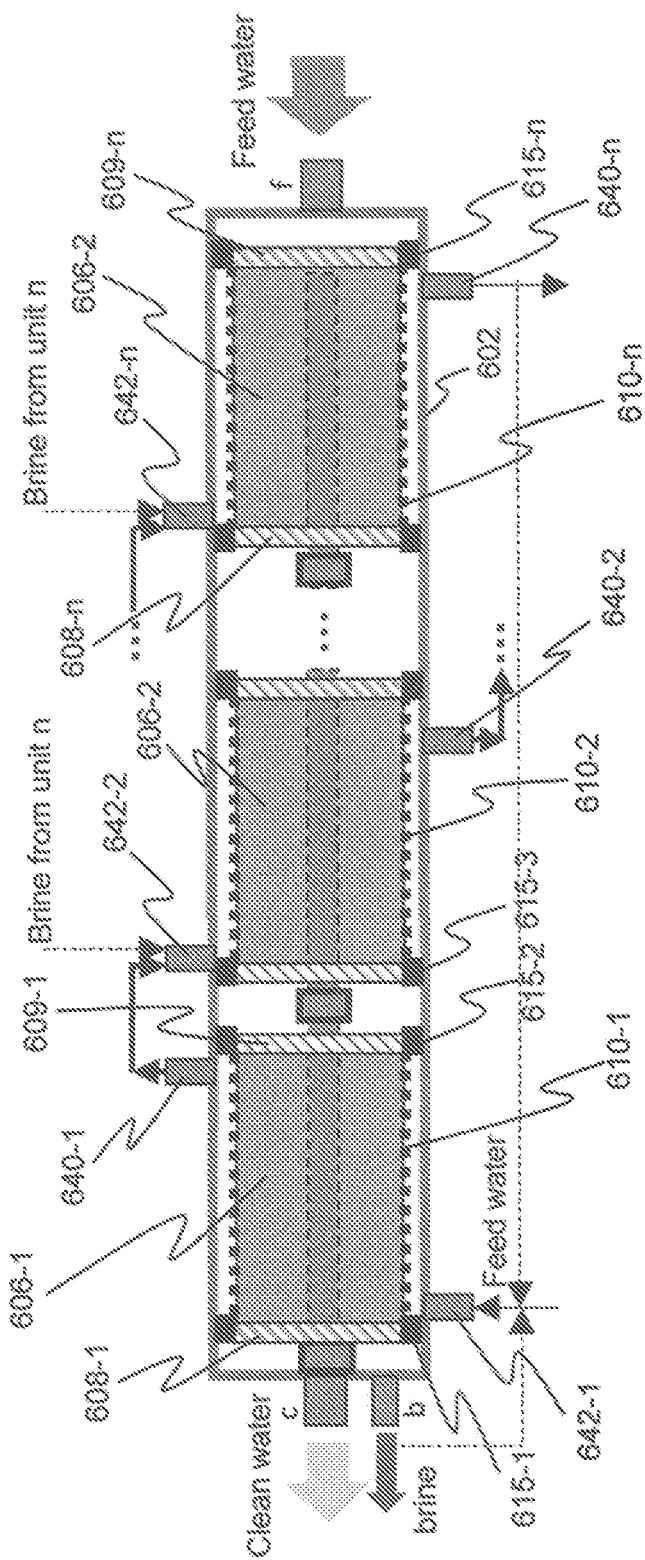

FIGS. 6A and 6B demonstrate further embodiments with multiple spiral wound MD units in a single housing in accordance with embodiments disclosed herein. In FIG. 6A, multiple spiral wound MD units (606a-1, 606a-2 . . . 606a-n) are connected in series in a single housing (602). In the embodiments described by FIG. 6A, the flow distribution devices (608-1 and 609-n) nearest to the ends of the housing allow fluid to flow, while the remaining flow distribution devices (608-2 . . . 608-n and 609-1 . . . 609-(n–1)) include seals (615-1 . . . 615-n) preventing the fluid from flowing in (or out) of the gap between the spiral wound MD units (606-1 and 606-n) and the housing (602).

The embodiments of FIG. 6A also include additional brine outlets (640-1 . . . 640-n) and additional feed water inlets (642-1 . . . 642-n). The additional brine outlets (640-1 . . . 640-n) and additional feed water inlets (642-1 . . . 642-n) are arranged along the housing (602) to supply the feed water to the gaps between the spiral wound MD units (606-1 and 606-n) and the housing (602) between consecutive seals (615-1 . . . 615-n). As in other embodiments, the brine from the brine outlet (b) may be fed back to the feed water inlet (f). The brine from the brine outlet (b) may also be fed back to one or all of the additional feed water inlets (642-1 . . . 642-n) in accordance with these embodiments.

Similar to FIG. 6A, embodiments described by FIG. 6B include multiple spiral wound MD units (606b-1, 606b-2 . . . 606b-n) connected in series in a single housing (602). However, all of the flow distribution devices (608-1 . . . 608-n and 609-1 . . . 609-n) include seals (615-1 . . . 615-n) preventing the fluid from flowing in (or out) of the gap between the spiral wound MD units (606b-1 and 606b-n) and the housing (602). Additional brine outlets (640-1, 604-2 . . . 640-n) and additional feed water inlets (642-1 . . . 642-n) are arranged along the housing (602) to supply the feed water to the multiple spiral wound MD units (606b-1 and 606b-n). Like FIG. 6A, the brine from the brine outlet (b) may be fed back to the feed water inlet (f) and/or one or more of the additional feed water inlets (642-1 . . . 642-n).

In the embodiments shown in FIGS. 6A and 6B, each of the spiral wound MD units (606-1 and 606-n) are shown with a thermal element (610-1 . . . 610-n); however, embodiments disclosed herein are limited as such. For example, the first spiral wound MD unit (606-1) may include a thermal element (610-1) and the residual heat in the brine from the first spiral wound MD unit (606-1) may serve as the heat source for one or more of the subsequent spiral wound MD units (606-2 . . . 606-n). Thus, one or more subsequent spiral wound units may not include a thermal element. In such embodiments, one or more downstream spiral wound units may include a thermal element (610) to supply the necessary heat to generate the desired flux of the multiple unit device.

Figure 7A:
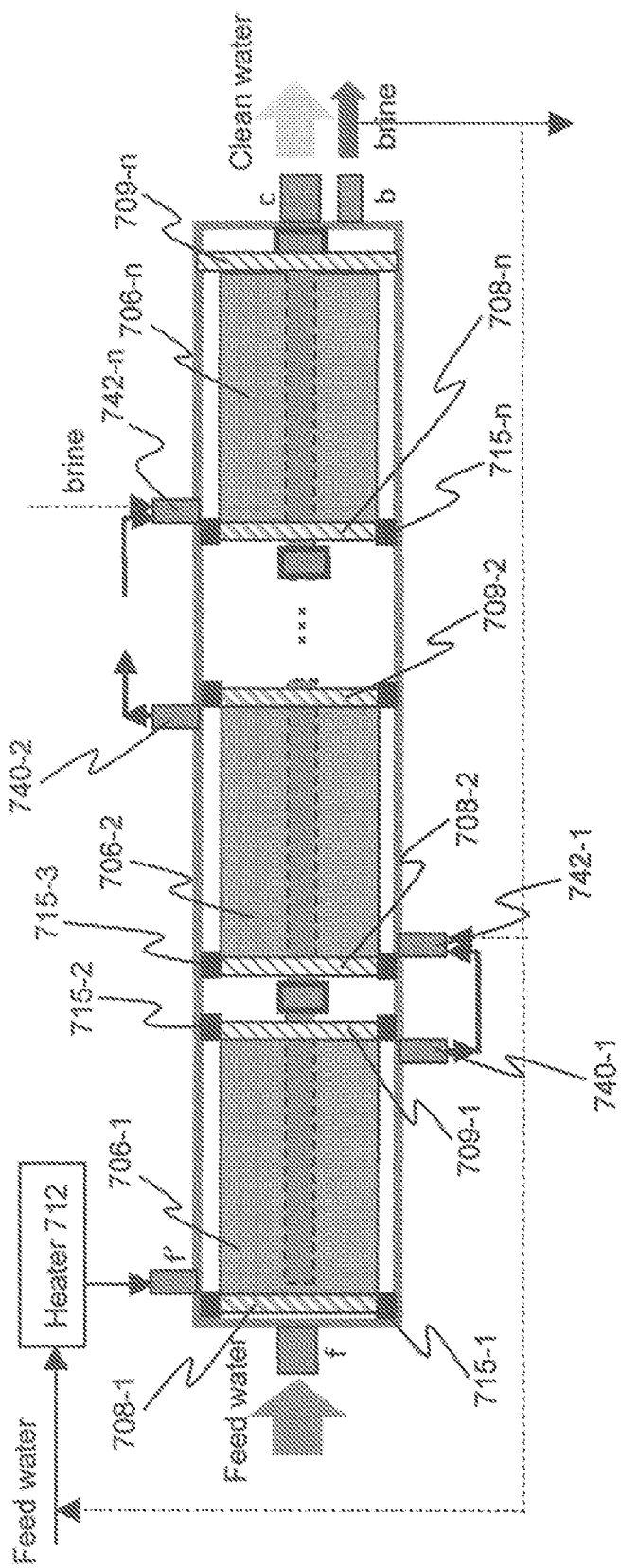
FIGS. 7A and 7B show schematics of a multiple unit device in accordance with one or more embodiments disclosed herein.
Figure 7B:
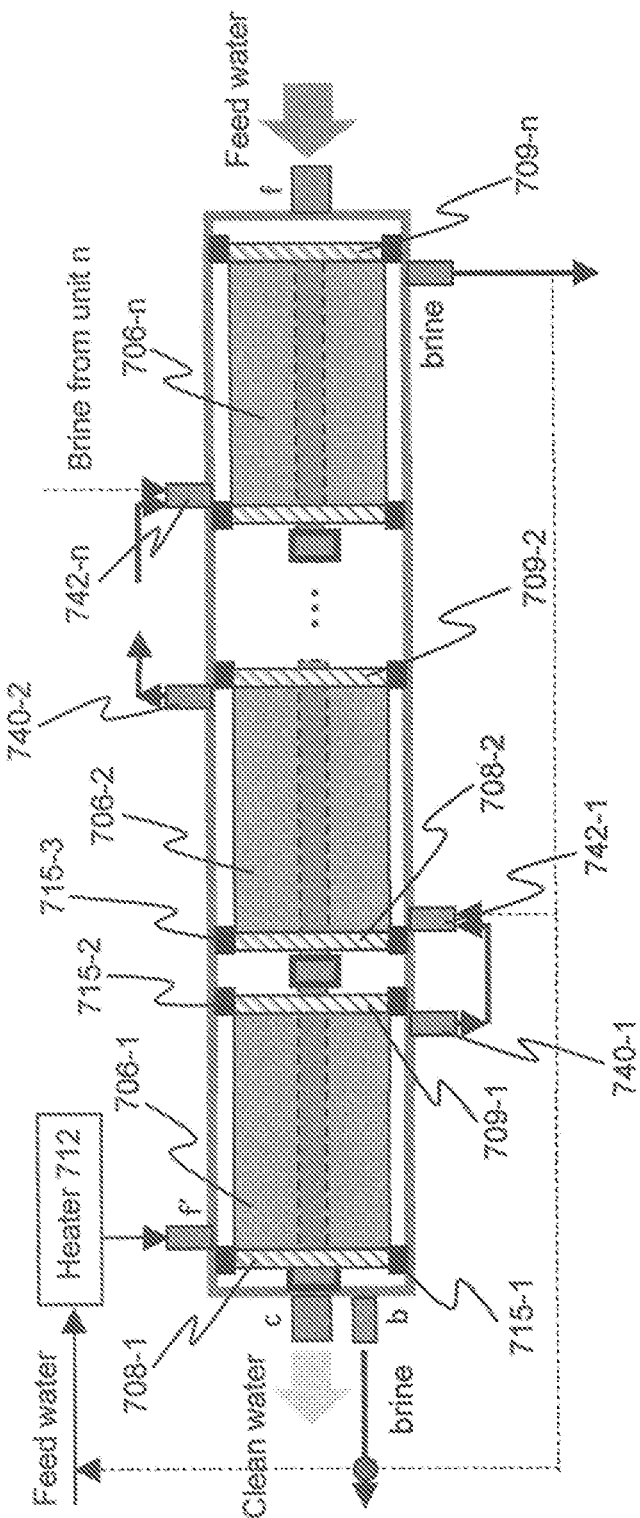

FIGS. 7A and 7B demonstrate further embodiments with multiple spiral wound MD units in a single housing in accordance with embodiments disclosed herein.

Similar to embodiments disclosed in reference to FIG. 1B, embodiments described by FIGS. 7A and 7B include a heater (712) that heats a portion of the feed water. As shown in FIGS. 7A and 7B, the heater (712) supplies a heated portion of the feed water to the additional inlet (f).

In FIG. 7A, the flow distribution devices (708-1 . . . 708-n and 709-1 and 709-2) include seals (715-1 . . . 715-n), but the flow distribution device (709-n) closest to the clean water outlet (c) and brine outlet (b) does not include a seal. Similar to FIG. 6B, the embodiments described by FIG. 7A include additional brine outlets (740-1 . . . 740-n) and additional feed water inlets (742-1 . . . 742-n) to supply the feed water to the multiple spiral wound MD units (706-1 and 706-n).

In FIG. 7B, all the flow distribution devices (708-1 . . . 708-n and 709-1 . . . 709-n) include seals (715-1 . . . 715-n). Similar to previous embodiments, the brine from the brine outlet (b) may be fed back to the feed water inlet (f) and/or one or more of the additional feed water inlets (742-1 . . . 742-n).

In the embodiments shown in FIGS. 7A and 7B, the heater (712) provides the heated feed water to the additional inlet (f'); however, one of ordinary skill in the art will recognize that the heated feed water may also be supplied to one or more additional feed water inlets (742).

Embodiments disclosed herein may provide a low-cost desalination system and, thus, may be used in individual households or commercial properties (e.g., hotels, resorts, apartment complexes). In addition to water and wastewater treatment, embodiments may have applications in industries that produce saline wastewater or other concentrated waste streams, such as oil and gas, mining, and food processing industries. Embodiments disclosed herein may benefit municipalities that use saline water sources, such as brackish water and seawater, as water supplies, or farms that with salty irrigation drainage water or the need to use saline water as a water supply source.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A distillation device, comprising:
   a cylindrical housing;
   a spiral wound membrane distillation (MD) unit, the spiral wound MD unit comprising:
   a perforated center tube concentric to the cylindrical housing;

a plurality of effects spirally wound around the center tube, wherein each effect comprises:
a vapor permeable membrane;
a feed spacer disposed on the vapor permeable membrane;
a permeate spacer; and
a heat exchange film sealed to the vapor permeable membrane on three edges, wherein the unsealed edge is attached to the perforated center tube,
wherein the permeate spacer is disposed between the vapor permeable membrane and the heat exchange film and wherein the permeate spacer coincides with the perforations of the center tube,
wherein distillation of a feed fluid by the plurality of effects deposits a condensate fluid into the center tube.

2. The distillation device of claim 1, the distillation device further comprises:
two flow distribution devices disposed on each end of the spiral wound MD unit;
a first cap on one end of the cylindrical housing comprising a feed water inlet; and
a second cap on the other end of the cylindrical housing comprising a clean water outlet attached the center tube and a brine outlet.

3. The distillation device of claim 2, wherein the radius of the flow distribution devices is equal to an inner diameter of the housing.

4. The distillation device of claim 2, wherein the radius of the flow distribution devices is equal to a radius of the spiral wound MD unit, the distillation device further comprises:
two seals arranged between the flow distribution devices and the inner diameter of the housing.

5. The distillation device of claim 4, further comprising:
an additional feed water inlet on the housing in a radial direction and arranged to receive heated water supplied from a heater or other heating equipment; and
an additional brine outlet on the housing in a radial direction,
wherein the additional feed water inlet and the additional brine outlet are arranged between the seals.

6. The distillation device of claim 5, further comprising:
a fluid pathway from the additional brine outlet to the heater to feed back brine from the brine outlet to the additional feed water inlet.

7. The distillation device of claim 5, further comprising:
a fluid pathway from the brine outlet to the heater to feed back brine from the brine outlet to the additional feed water inlet.

8. The distillation device of claim 1, the spiral wound membrane distillation (MD) unit further comprising:
a thermal element for supplying heat disposed on the vapor permeable membrane.

9. The distillation device of claim 8, wherein the thermal element is electrothermal or photothermal.

10. The distillation device of claim 8, further comprising:
a parabolic concentrator that concentrates solar radiation onto the distillation device, wherein the thermal element is photothermal.

11. A distillation device, comprising:
a cylindrical housing;
a plurality of spiral wound membrane distillation (MD) units connected in series, each spiral wound MD unit comprising:
a perforated center tube concentric to the cylindrical housing;
a plurality of effects spirally wound around the center tube, wherein each effect comprises:
a feed spacer;
a vapor permeable membrane;
a permeate spacer; and
a heat exchange film,
wherein the permeate spacer is disposed between the vapor permeable membrane and the heat exchange film, and
wherein distillation of a feed fluid by the plurality of effects of each of the spiral wound MD units deposits a condensate fluid into the center tube on each of the plurality of spinal wound MD units.

12. The distillation device of claim 11, further comprising:
two flow distribution devices disposed on each end of the plurality of spiral wound MD units;
a first cap on one end of a cylindrical housing of one of the plurality of spiral wound MD units comprising a feed water inlet; and
a second cap on the other end of a cylindrical housing of another one of the plurality of spiral wound MD units comprising a clean water outlet attached the center tube of the another one of the plurality of spiral wound MD units and a brine outlet.

13. The distillation device of claim 12, wherein the radius of at least one of the flow distribution devices is equal to an inner diameter of the housing.

14. The distillation device of claim 12, wherein the radius of at least one of the flow distribution devices is equal to the radius of one of the plurality of the spiral wound MD units on which the flow distribution device is disposed, the distillation device further comprising:
a seal arranged between the flow distribution device that is equal in size to the radius of the spiral wound MD unit and the inner diameter of the housing.

15. The distillation device of claim 11, further comprising:
one or more additional feed water inlets on the body of the housing arranged in a radial direction; and
one or more additional brine outlets on the body of the housing arranged in a radial direction.

16. The distillation device of claim 15, wherein a heater heats feed water supplied to at least one of the additional feed water inlets.

17. The distillation device of claim 15, further comprising:
a fluid pathway from one of the one or more additional brine outlets to one of the one or more additional feed water inlets,
wherein one of the one or more additional brine outlets is arranged on the housing at a position adjacent to a first spiral wound MD unit of the one of the plurality of spiral wound MD units, and
wherein one of the one or more additional feed water inlets is arranged on the housing at a position adjacent to a second spiral wound MD unit of the plurality of spiral wound MD units.

18. The distillation device of claim 12, wherein at least one of the plurality of spiral wound MD units comprises:
a thermal element for supplying heat disposed on the vapor permeable membrane.

19. The distillation device of claim 2, wherein the feed water is wastewater from an industrial process or from sea water.

20. A method of manufacturing a distillation device, the method comprising:
- sealing a rectangular vapor membrane film to a rectangular heat exchange film on three edges;
- disposing a permeate spacer between the vapor membrane film and the heat exchange film;
- disposing a feed spacer film on the vapor membrane film;
- attaching the unsealed edge to a perforated center tube, wherein the permeate spacer coincides with the perforations of the center tube; and
- rotating the center tube to form a spiral wound membrane distillation (MD) unit.

* * * * *